(12) United States Patent
Howseman, Jr.

(10) Patent No.: US 9,630,202 B1
(45) Date of Patent: Apr. 25, 2017

(54) PLUNGER-TYPE DISPENSING VALVE FOR THE RAPID DEPOSITION OF ADHESIVE TO ROAD PAVEMENT SURFACES FOR ENABLING THE FIXATION OF PAVEMENT MARKERS TO ROAD PAVEMENT SURFACES

(71) Applicant: William E. Howseman, Jr., Camarillo, CA (US)

(72) Inventor: William E. Howseman, Jr., Camarillo, CA (US)

( * ) Notice: Subject to any disclaimer, the term of this patent is extended or adjusted under 35 U.S.C. 154(b) by 35 days.

(21) Appl. No.: 14/877,832

(22) Filed: Oct. 7, 2015

(51) Int. Cl.
  *B05C 5/02* (2006.01)
  *B05C 5/00* (2006.01)
  *F16K 23/00* (2006.01)
  *F16K 49/00* (2006.01)
  *F16K 31/12* (2006.01)
  *F16K 1/12* (2006.01)
  *E01C 23/18* (2006.01)

(52) U.S. Cl.
  CPC ............ *B05C 5/0237* (2013.01); *B05C 5/001* (2013.01); *F16K 1/126* (2013.01); *F16K 23/00* (2013.01); *F16K 31/12* (2013.01); *F16K 49/00* (2013.01); *E01C 23/18* (2013.01)

(58) Field of Classification Search
  CPC ....... B05C 5/0237; B05C 5/001; F16K 23/00; F16K 31/12; F16K 1/126; F16K 49/00; E01C 23/18
  USPC ......................................................... 222/318
  See application file for complete search history.

(56) References Cited

U.S. PATENT DOCUMENTS

| 3,540,358 | A | 11/1970 | Oakley |
| 4,859,073 | A | 8/1989 | Howseman, Jr. et al. |
| 4,887,741 | A | 12/1989 | Downing |
| 5,888,018 | A | 3/1999 | Green |
| 5,934,822 | A | 8/1999 | Green |
| 7,614,529 | B2 | 11/2009 | Bolyard, Jr. et al. |
| 8,746,501 | B2 | 6/2014 | Saine |
| 9,126,751 | B2 | 9/2015 | Dorman et al. |
| 2002/0139818 | A1 | 10/2002 | McGuffey |
| 2003/0062384 | A1* | 4/2003 | McGuffey ............. B05C 5/0225 222/109 |
| 2003/0080153 | A1* | 5/2003 | Saidman ................. B05C 5/001 222/146.5 |
| 2005/0236438 | A1* | 10/2005 | Chastine ................. B05C 5/001 222/504 |
| 2011/0132923 | A1* | 6/2011 | Miller .................... B44D 3/003 222/1 |

* cited by examiner

*Primary Examiner* — Donnell Long
(74) *Attorney, Agent, or Firm* — Law Offices of Steven W. Weinrieb

(57) ABSTRACT

A reciprocating plunger-type valve mechanism or assembly, which can be utilized in conjunction with adhesive dispensing applicators to control the dispensing of adhesive compositions which are to be used in connection with the bonding, securing, or fixation of pavement markers to road pavement surfaces, is disclosed. The mechanism or assembly comprises dual shutoff locations in connection with the supply of the incoming adhesive material so as to effectively reduce the prevailing pressure upon the shutoff blade controlling the adhesive material dispensing/discharge port whereby soft pressure starts and controlled deposition quantities are enabled while the generation of residual adhesive material or splatter is avoided.

30 Claims, 4 Drawing Sheets

PLUNGER-TYPE DISPENSING VALVE FOR THE RAPID DEPOSITION OF ADHESIVE TO ROAD PAVEMENT SURFACES FOR ENABLING THE FIXATION OF PAVEMENT MARKERS TO ROAD PAVEMENT SURFACES

FIELD OF THE INVENTION

The present invention relates generally to dispensing valve mechanisms or assemblies, and more particularly to a new and improved reciprocating plunger-type dispensing valve mechanism which can be utilized in conjunction with adhesive dispensing applicators to control the dispensing of adhesive compositions which are to be used in connection with the bonding, securing, or fixation of pavement markers to road pavement surfaces.

BACKGROUND OF THE INVENTION

Pavement markers are conventionally applied to road pavement surfaces by means of a suitable adhesive. Various adhesive dispensing mechanisms are conventionally mounted upon a road vehicle that moves along a road pavement surface upon which the pavement markers are to be applied. The adhesive material is dispensed onto a predetermined location of the road pavement surface by means of the particular adhesive dispensing mechanism or apparatus, and subsequently, a technician/operator, riding upon the road vehicle at a position directly behind the dispensing mechanism or apparatus, or another mechanism of the dispensing apparatus located upon the vehicle at a position directly behind the dispensing mechanism or apparatus, applies a pavement marker to the freshly deposited adhesive. When the adhesive cures, the pavement marker is fixedly secured or bonded to the road pavement surface.

Various valve mechanisms or adhesive applicators, utilized in conjunction with pavement marker application machines, or for other purposes, are of course well known such as, for example, U.S. Pat. No. 4,887,741 which issued to Downing on Dec. 19, 1989, U.S. Pat. No. 5,888,018 which issued to Green on Mar. 30, 1999, U.S. Pat. No. 5,934,822 which issued to Green on Aug. 10, 1999, United States Patent Application Publication 2002/0139818 which was published on Oct. 3, 2002 for McGuffey, U.S. Pat. No. 7,614,529 which issued to Bolyard, Jr. et al. on Nov. 10, 2009, United States Patent Application Publication 2013/0334252 which was published on Dec. 19, 2013 for Dorman et al., and U.S. Pat. No. 8,746,501 which issued to Saine on Jun. 10, 2014.

In order for an adhesive dispensing valve to be suitable for the deposition of adhesive material onto a pavement road surface so as to successfully facilitate the fixation of a pavement marker to the pavement road surface, the adhesive dispensing valve must satisfy several important operating criteria. For example, the valve needs to effectively provide the adhesive deposition with a consistent shape and thickness, such as, for example, a substantially square deposit of material of approximately four and one-half inches per side to which, for example, a four-inch square pavement marker can be adhered, and with a thickness of approximately one-eighth to one-quarter of an inch, although the particular thickness will vary depending upon the type and coarseness of the road surface to which the markers are being applied. Along these lines, it is to be noted that rough chip seal roads require a thicker deposit of adhesive than smooth concrete.

In addition, the valve needs to dispense the adhesive material extremely quickly. The faster the valve can dispense the required amount of adhesive, the faster the road vehicle carrying the adhesive applicator apparatus can travel down the road, the greater the distance that can be covered within a predetermined time frame, the greater the number of pavement markers that can be applied to the pavement road surface within such timeframe, and hence, the greater the productivity per roadwork shift. For example, when the road vehicle travels at a speed of one mph (1 mph), the vehicle will travel approximately seventeen inches per second (17"/sec), and the entire adhesive dispensing cycle would then need to be accomplished within approximately two hundred sixty five milliseconds (265 ms). Alternatively, if the road vehicle travels at a speed of four mph (4 mph), the vehicle will travel approximately sixty-eight inches per second (68"/sec), and the entire adhesive dispensing cycle would then need to be accomplished within approximately sixty six milliseconds (66 ms). This rapid cycling of the dispensing of the adhesive composition by means of the applicator dispensing valve permits the applicator road vehicle to move continuously along the road pavement as opposed to being required to stop and start at each marker location in order to dispense the adhesive composition. This reduces wear and tear upon the vehicle while increasing productivity. The valve also needs to dispense the adhesive material with clean and consistent commencement and termination of the dispensing process. This reduces the generation of adhesive material tails, trailing adhesive depositions, or adhesive splatter upon the road pavement surface as the vehicle continues to move forwardly along the road pavement surface. Lastly, the valve must also exhibit good durability and serviceability so as to effectively provide a lengthy service life throughout which millions of pavement markers will be applied to the road pavement surfaces while maintenance or service operations and downtime is minimized.

A need therefore exists in the art for a new and improved plunger-type dispensing valve which can be specifically used for dispensing adhesive compositions onto road pavement surfaces, wherein such dispensing valve will meet the aforenoted criteria and achieve the aforenoted objectives so as to in fact be capable of rapidly affixing pavement markers to road pavement surfaces at predetermined locations along the road pavement surfaces.

SUMMARY OF THE INVENTION

The foregoing and other objectives are achieved in accordance with the teachings and principles of the present invention through the provision of a new and improved plunger-type dispensing valve which comprises a valve housing, and a piston-cylinder assembly disposed within a first upper section of the valve housing wherein the piston comprises a piston head and a piston rod. A lower end portion of the piston rod is fixedly connected to a first uppermost enlarged diameter portion of a valve plunger. The piston-cylinder assembly may be operated either pneumatically or hydraulically, and the combination of the piston-cylinder assembly and the valve plunger comprise the only moving part of the entire dispensing valve. The valve plunger extends vertically downwardly through a second intermediate section of the valve housing wherein a second lowermost enlarged diameter portion of the valve plunger has a valve member or shutoff blade fixedly connected thereto. The valve member or shutoff blade is adapted to operatively cooperate with, for example, a pair of oppositely disposed shutoff output plates which define an adhesive material dispensing or discharge output port within a third lowermost section of the valve housing. An adhesive material inlet supply port is fluidically connected to a first side portion of the second intermediate section of the valve housing, while an adhesive material outlet recirculation port is fluidically connected to a second side portion of the second intermediate section of the valve housing. The valve plunger is vertically reciprocable within a cylinder portion of the second intermediate section of the valve housing so as to be interposed between the adhesive material inlet supply port and the adhesive material outlet recirculation port. The valve plunger further comprises a third intermediate enlarged diameter portion interposed between the first uppermost enlarged diameter portion connected to the piston rod and the second lowermost enlarged diameter portion connected to and mounting the valve member or shutoff blade thereon. Still further, a first upper annularly configured reduced diameter portion of the valve plunger is defined between the first and third enlarged diameter portions of the valve plunger while a second lower annularly configured reduced diameter portion of the valve plunger is defined between the second and third enlarged diameter portions of the valve plunger.

Accordingly, as will become more apparent hereinafter when reference is made to the accompanying drawings, when the valve plunger is disposed at its lowermost position whereby the valve member or shutoff blade is fully interposed between the pair of oppositely disposed shutoff outlet plates, or an alternatively configured valve seat, thereby defining the fact that the dispensing valve is disposed at its fully CLOSED position, the first upper annularly configured reduced diameter section of the valve plunger will effectively permit fluid communication between the adhesive material inlet supply port and the adhesive material outlet recirculation port such that the adhesive material is continuously recirculated throughout the system by means of a suitable pump operatively connected to an adhesive material reservoir or supply tank. The third intermediate enlarged diameter section of the valve plunger effectively prevents the adhesive material from flowing downwardly toward the dispensing or discharge output port, while the first uppermost enlarged diameter section of the valve plunger, in conjunction with a plunger rod seal annularly surrounding the first uppermost enlarged diameter section of the valve plunger, effectively prevents the adhesive material from flowing upwardly toward the piston-cylinder assembly.

To the contrary, when the valve plunger is disposed at its uppermost position whereby the valve member or shutoff blade is fully retracted from its disposition within its valve seat or between the pair of oppositely disposed shutoff output plates, thereby defining the fact that the dispensing valve is now disposed at its fully OPEN position, the third intermediate enlarged diameter section of the valve plunger will now be interposed between the adhesive material inlet supply port and the adhesive material outlet recirculation port such that the incoming adhesive material cannot flow toward the adhesive material outlet recirculation port but can only flow downwardly, annularly around the second annular reduced diameter portion of the valve plunger, and through annular conduits leading to and fluidically connected with the dispensing valve output or discharge port.

It is lastly to be noted that when the plunger valve is disposed at an intermediate TRANSITION position, that is at a position where the valve member or shutoff blade is only partially elevated and retracted away from the adhesive material dispensing valve output or discharge port, the third intermediate enlarged diameter portion of the valve plunger will be disposed directly opposite the adhesive material inlet supply port. Accordingly, all incoming fluid flow of the adhesive material is, at this point in time, blocked—all fluid flow of the adhesive material coming in from the adhesive material inlet supply port is zero, all fluid flow of the adhesive material to the adhesive material outlet recirculation port is zero, and all fluid flow of the adhesive material to the dispensing valve output or discharge port is likewise zero. This structure is extremely important in connection with the operation of the dispensing valve when the valve plunger is moved both from the fully CLOSED position to the fully OPEN position, as well as from the fully OPEN position to the fully CLOSED position, because, as will become more apparent hereinafter when reference is made to the drawings, the dispensing valve of the present invention effectively has dual shutoff locations, one at the adhesive material inlet supply port and one at the adhesive material output dispensing or discharge port. More particularly, this structure is extremely important in connection with the operation of the dispensing valve when the valve plunger is moved from the CLOSED position to the OPEN position because immediately before fluid flow is established from the adhesive material inlet supply port to the adhesive material output dispensing or discharge port, the prevailing line pressure at the adhesive material output dispensing or discharge port is minimal because the adhesive material inlet supply port, located upstream from the adhesive material output dispensing or discharge port, has been blocked or terminated by the disposition of the third intermediate enlarged diameter portion of the valve plunger being disposed directly opposite the adhesive material inlet port. This facilitates the achievement of "soft starts" or the dispensing of proper adhesive material outputs, as opposed to the deposition of excessive adhesive material outputs, because the relatively large line pressure does not immediately impact the adhesive material output dispensing or discharge port as would otherwise be the case if the relatively large line pressure was permitted to build up immediately behind the valve member or shutoff blade and to then be released when the valve member or shutoff blade is retracted so as to be moved to the fully OPEN position.

Alternatively, this structure also minimizes the likelihood of the formation of any residual material or splatter being discharged from the adhesive material output dispensing or discharge port when the valve plunger is moved from the fully OPEN position to the fully CLOSED position. This is because, just as was the fact that the valve member or shutoff blade was partially retracted vertically upwardly from its fully CLOSED position before the third enlarged diameter portion of the valve plunger was likewise moved vertically upwardly a sufficient distance so as to begin to OPEN the adhesive material inlet supply port, in this opposite directional movement scenario, wherein the valve plunger is being moved downwardly from its fully OPEN position to the fully CLOSED position, the third enlarged diameter portion of the valve plunger will fully block and close off the adhesive material inlet supply port before the valve member or shutoff blade is disposed at its fully CLOSED position. Accordingly, at this point in time, the line pressure prevailing at the valve member or shutoff blade is minimized, and as the valve member or shutoff blade seats or enters the adhesive material output dispensing or discharge port and terminates at a position flush with the undersurface portions of the adjacent shutoff outlet plates, it effectively pushes or forces any residual adhesive material out from adhesive material output dispensing or discharge port such that trailing ends or splatter of the adhesive material are minimized.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
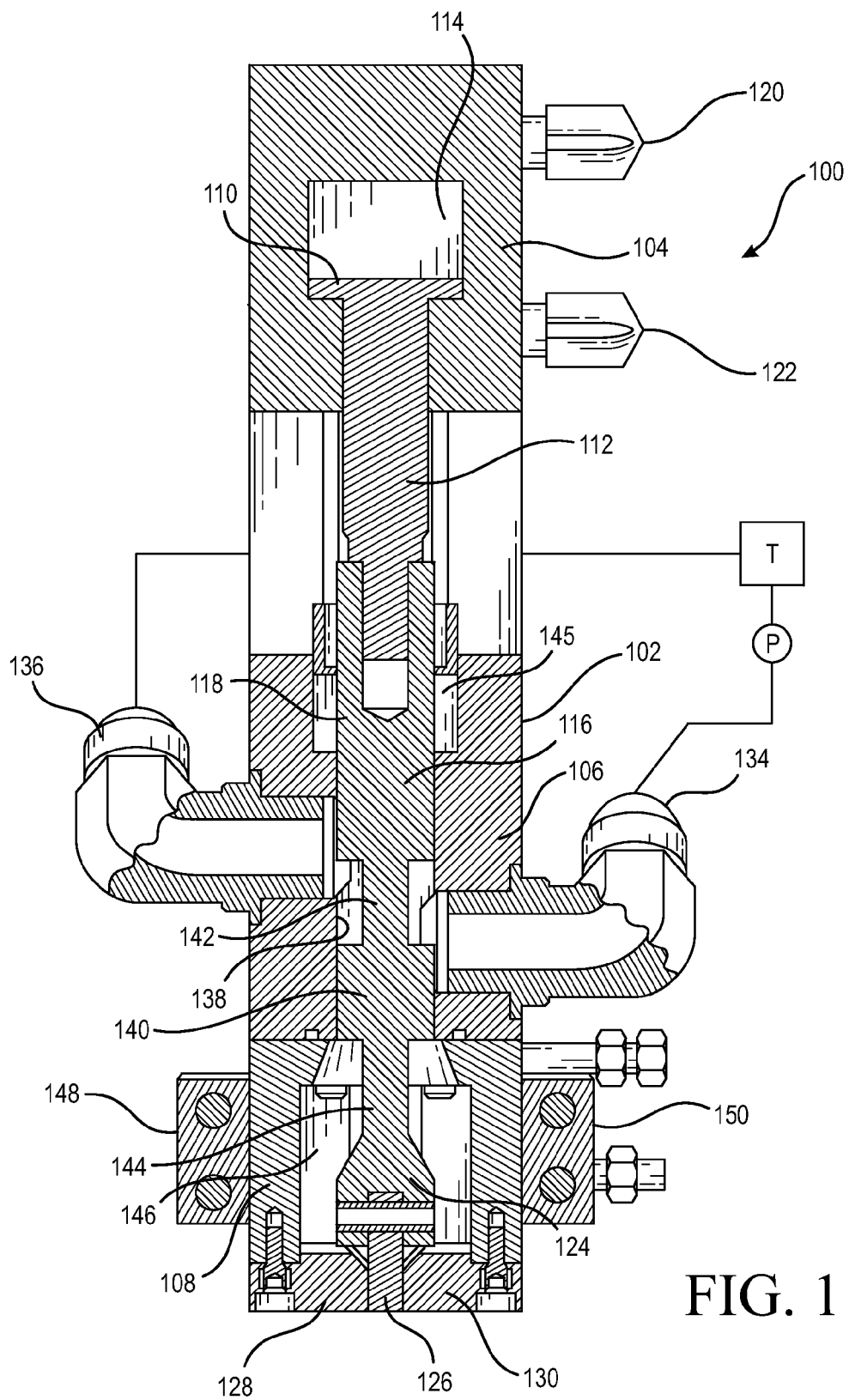
FIG. 1 is a cross-sectional view showing the new and improved plunger-type dispensing valve at its CLOSED position at which the valve member or shutoff blade is closed with respect to its valve seat or oppositely disposed pair of shutoff output plates, a third intermediate diametrically enlarged portion of the valve plunger effectively blocks fluid flow of the adhesive material from the adhesive material inlet supply port to the valve shutoff blade and the dispensing valve discharge or output port, while a first upper annularly configured diametrically reduced portion of the valve plunger effectively provides a fluid flow path between the adhesive material inlet supply port and the adhesive material recirculation outlet port such that the adhesive material is continuously recirculated while the plunger-type dispensing valve is disposed at the CLOSED position.

Referring now to the drawings, and more particularly to FIG. 1 thereof, the new and improved plunger-type dispensing valve is disclosed and is generally designated by the reference character 100. More particularly, it is seen that the dispensing valve 100 comprises a valve housing 102 wherein the valve housing 102 effectively comprises a first uppermost section 104, a second intermediate section 106, and a third lowermost section 108. A piston-cylinder assembly is disposed within the first uppermost section 104 of the valve housing 102 and is seen to comprise a piston which, in turn, comprises a piston head 110 and a piston rod 112, the piston head 110 being vertically movable within a cylinder portion 114 of the first uppermost section 104 of the valve housing 102. A lower end portion of the piston rod 112 is fixedly connected to a first uppermost enlarged diameter portion 116 of a valve plunger 118. The piston-cylinder assembly may be operated either pneumatically or hydraulically wherein a pair of vertically spaced input/output ports or connectors for the incoming hydraulic fluid or compressed air are disclosed at 120,122. The upper port or connector 120 is fluidically connected to the cylinder 114, by means of a fluid conduit, not shown, such that the incoming fluid can act upon the upper surface portion of the piston head 110 so as to drive the piston vertically downwardly, while the lower port or connector 122 is fluidically connected to the cylinder 114, by means of another fluid conduit, also not shown, such that the incoming fluid can act upon the undersurface portion of the piston head 110 so as to drive the piston vertically upwardly. Controls for routing the incoming driving fluid to the upper or lower connector 120 or 122, and therefore to the cylinder spaces above and below the cylinder head 110 in order to drive the piston vertically downwardly or upwardly, as well as for respectively exhausting fluid from the opposite cylinder space disposed beneath or above the piston head 110, are also not shown but are well known in the valve art. It is to be noted that a complete dispensing cycle comprises moving the piston actuator 110,112 and the valve plunger 118 from a CLOSED position to an OPEN position and back to the CLOSED position, as will be more fully discussed hereinafter, and that the combination of the piston-valve plunger assembly 110,112,118 comprise the only moving part of the entire dispensing valve 100.

Continuing further, it is seen that the valve plunger 118 extends vertically downwardly through the second intermediate section 106 of the valve housing 102 wherein a second lowermost enlarged diameter portion 124 of the valve plunger 118 has a valve member or shutoff blade 126 fixedly connected thereto. The valve member or shutoff blade 126 is adapted to operatively cooperate with a valve seat which, in this particular embodiment, comprises pair of oppositely disposed shutoff output plates 128,130 which define an adhesive material dispensing or discharge output port 132 therebetween within the third lowermost section 108 of the valve housing 102, which can best be seen, for example, within either FIG. 2 or FIG. 3. An adhesive material inlet supply port 134 is fluidically connected to a first side portion of the second intermediate section 106 of the valve housing 102, while an adhesive material outlet recirculation port 136 is fluidically connected to a second side portion of the second intermediate section 106 of the valve housing 102. The valve plunger 118 is vertically reciprocable within a cylinder portion 138 of the second intermediate section 106 of the valve housing 102 so as to be interposed between the adhesive material inlet supply port 134 and the adhesive material outlet recirculation port 136. The valve plunger 118 further comprises a third intermediate enlarged diameter portion 140 interposed between the first uppermost enlarged diameter portion 116 of the valve plunger which is connected to the piston rod 112 of the piston of the piston-cylinder assembly, and the second lowermost enlarged diameter portion 124 of the valve plunger 118 which is connected to and mounting the valve member or shutoff blade 126 thereon. Still further, a first upper annularly configured reduced diameter portion 142 of the valve plunger 118 is defined between the first and third enlarged diameter portions 116, 124 of the valve plunger 118, while a second lower annularly configured reduced diameter portion 144 of the valve plunger 118 is defined between the second and third enlarged diameter portions 124,140 of the valve plunger 118.

Accordingly, as is shown within FIG. 1, when the valve plunger 118 is disposed at its lowermost end position whereby the valve member or shutoff blade 126 is disposed at its lowermost position and fully interposed between the pair of oppositely disposed shutoff outlet plates 128,130 so as to be fully seated within the adhesive material dispensing or discharge port 132, thereby defining the fact that the dispensing valve 100 is disposed at its fully CLOSED position, the first upper annularly configured reduced diameter section 142 of the valve plunger 118 will effectively permit fluid communication between the adhesive material inlet supply port 134 and the adhesive material outlet recirculation port 136 such that the adhesive material is continuously recirculated throughout the system by means of a suitable pump P operatively connected to an adhesive material reservoir or supply tank T. This is desirable so as to effectively ensure that the temperature and viscosity parameters of the adhesive material remain homogeneous throughout the system which, in turn, ensure precise, repeatable operations of the valve 100 and the dispensing of uniform adhesive material deposits onto the pavement road surfaces.

At this time, it is also noted that the third intermediate enlarged diameter section 140 of the valve plunger 118 effectively prevents the adhesive material from flowing downwardly toward the valve member or shutoff blade 126 and the dispensing or discharge output port 132, while the first uppermost enlarged diameter section 116 of the valve plunger 118 effectively prevents the adhesive material from flowing upwardly toward the piston-cylinder assembly. An annular seal member 145 is disposed around the first uppermost enlarged diameter section 116 of the valve plunger 118. In this manner, it is noted that the piston-cylinder assembly, utilized for actuating or moving the valve plunger 118, is effectively divorced or separated from the valve plunger 118 so as to effectively isolate the piston-cylinder assembly from the heat generated within the valve plunger section of the dispensing valve 100 by means of the incoming or recirculated adhesive material. Concomitantly, this separated or divorced location of the piston-cylinder assembly relative to the valve plunger 118 likewise prevents any leakage of air or hydraulic fluid from the piston-cylinder assembly into the adhesive material should a leak occur within the piston-cylinder assembly.

Figure 3:
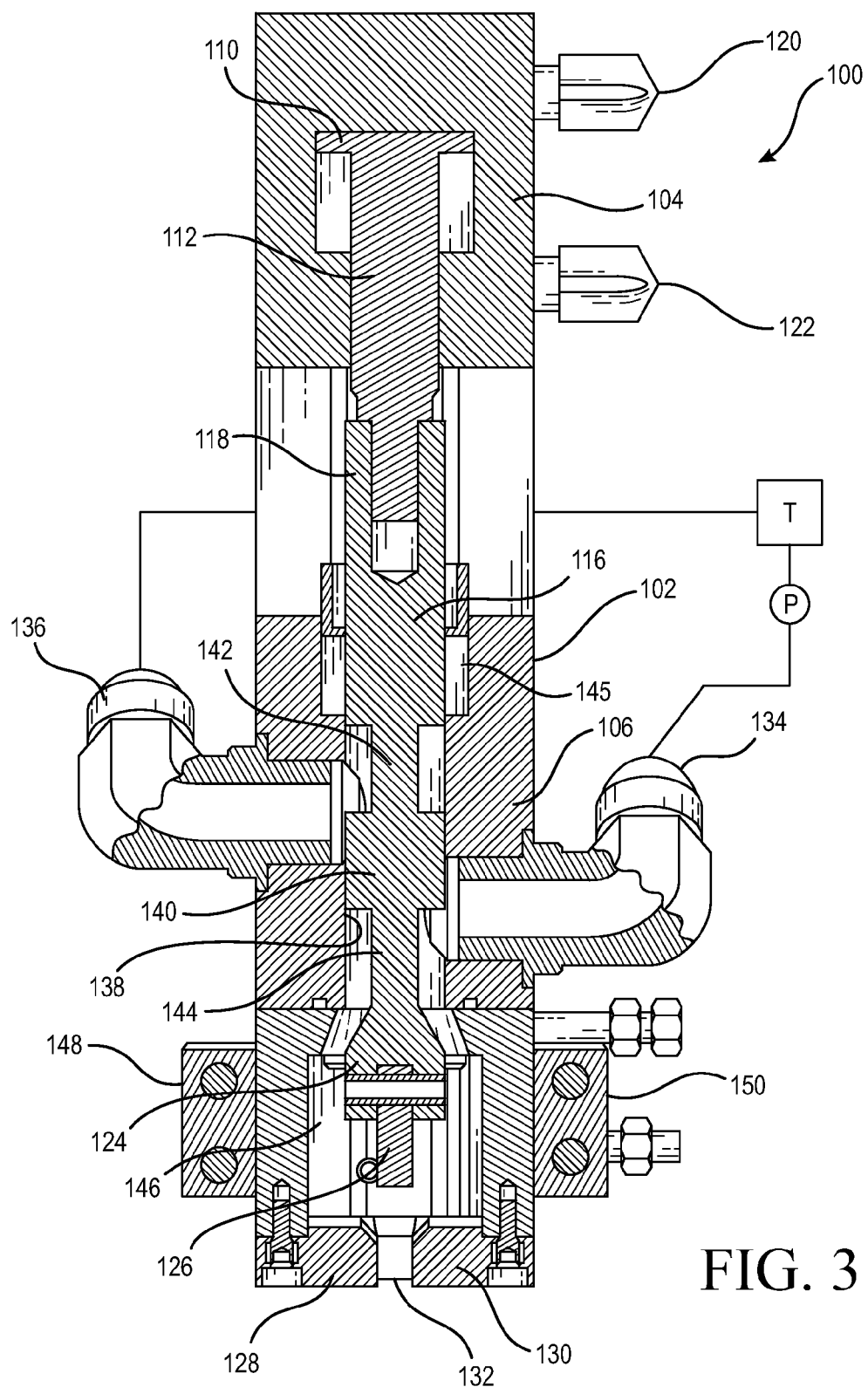
FIG. 3 is a cross-sectional view showing the new and improved plunger-type dispensing valve at its OPEN position at which the valve member or shutoff blade has been moved vertically upwardly still further from its TRANSITION position as disclosed within FIG. 2 such that the valve member or shutoff blade is now disposed at an elevated position with respect to its valve seat or oppositely disposed pair of shutoff outlet plates whereby the valve dispensing discharge or outlet port is fully OPEN, while the third intermediate diametrically enlarged portion of the valve plunger effectively is interposed between the adhesive material inlet supply port and the adhesive material recirculation outlet port so as to effectively block any fluid flow and recirculation of the adhesive material from the adhesive material inlet supply port to the adhesive material recirculation outlet port whereby the incoming adhesive material can only be conducted toward and discharged or dispensed out from the adhesive material dispensing outlet or discharge port and not recirculated back through the recirculation portion of the system.

To the contrary, when the valve plunger 118 is disposed at its uppermost end position, as can best be seen in FIG. 3, wherein the valve member or shutoff blade 126 has been fully retracted from its disposition between the pair of oppositely disposed shutoff output plates 128,130, as well as fully retracted or unseated from its disposition within the adhesive material dispensing or discharge port 132, thereby defining the fact that the dispensing valve 100 is now disposed at its fully OPEN position, it can be seen that the third intermediate enlarged diameter section 140 of the valve plunger 118 will now be interposed between the adhesive material inlet supply port 134 and the adhesive material outlet recirculation port 136 such that the incoming adhesive material cannot flow toward the adhesive material outlet recirculation port 136 but can only flow downwardly, annularly around the second annular reduced diameter portion 144 of the valve plunger 118, and through annular conduits 146 which are defined within the lowermost section 108 of the valve housing 102 and which are fluidically connected with the adhesive material dispensing valve output or discharge port 132.

Figure 2:
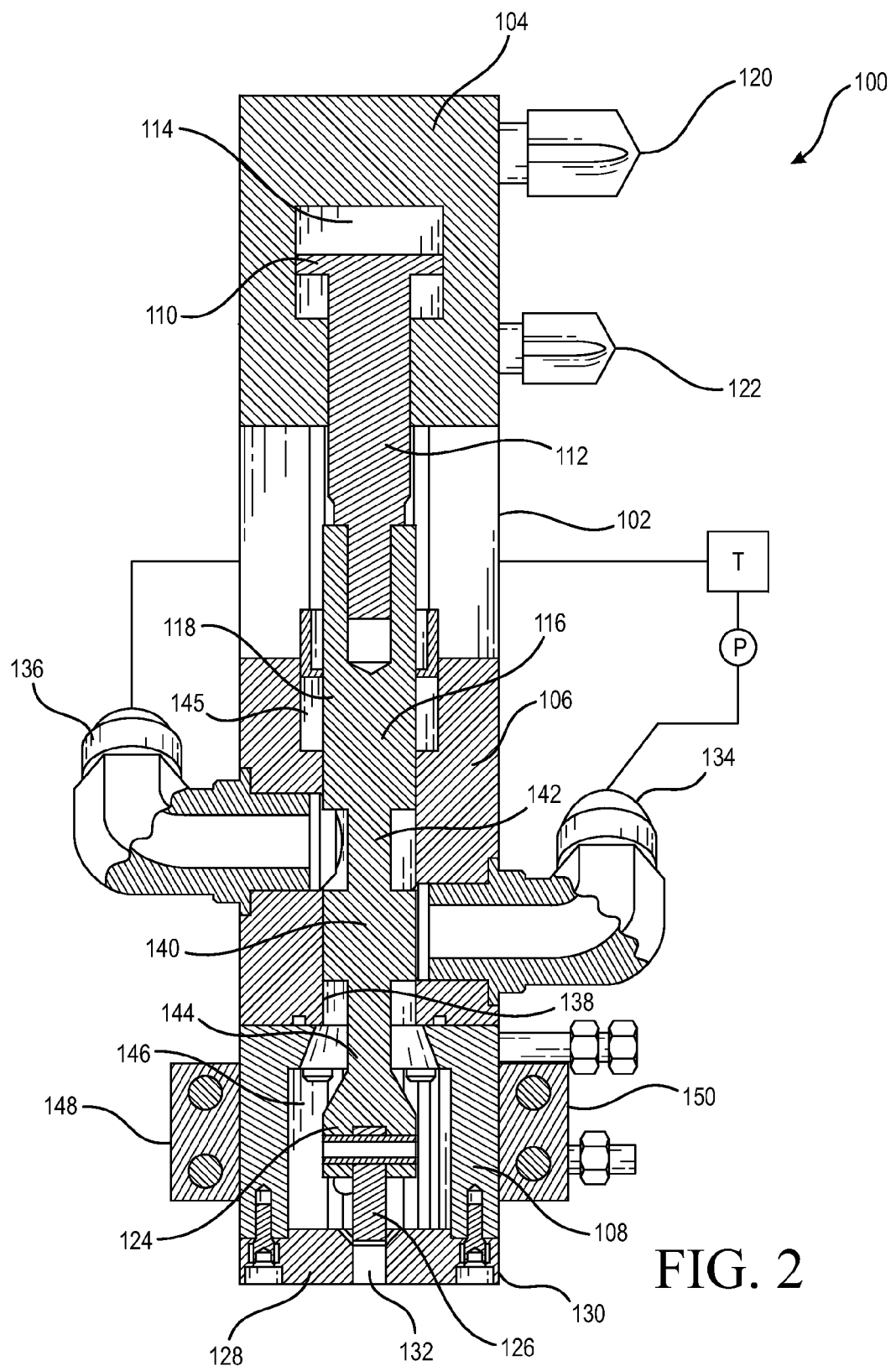
FIG. 2 is a cross-sectional view showing the new and improved plunger-type dispensing valve disposed at its TRANSITION position at which the valve member or shutoff blade has been moved vertically upwardly a predetermined amount from its CLOSED position with respect to its valve seat or pair of oppositely disposed shutoff output plates, while the third intermediate diametrically enlarged portion of the valve plunger has likewise been moved vertically upwardly a predetermined amount from its CLOSED position so as to now completely block the fluid flow of the adhesive material from the adhesive material input supply port to the adhesive material outlet recirculation port as well as to the valve member or shutoff blade and the dispensing valve discharge or output port.
Figure 4:
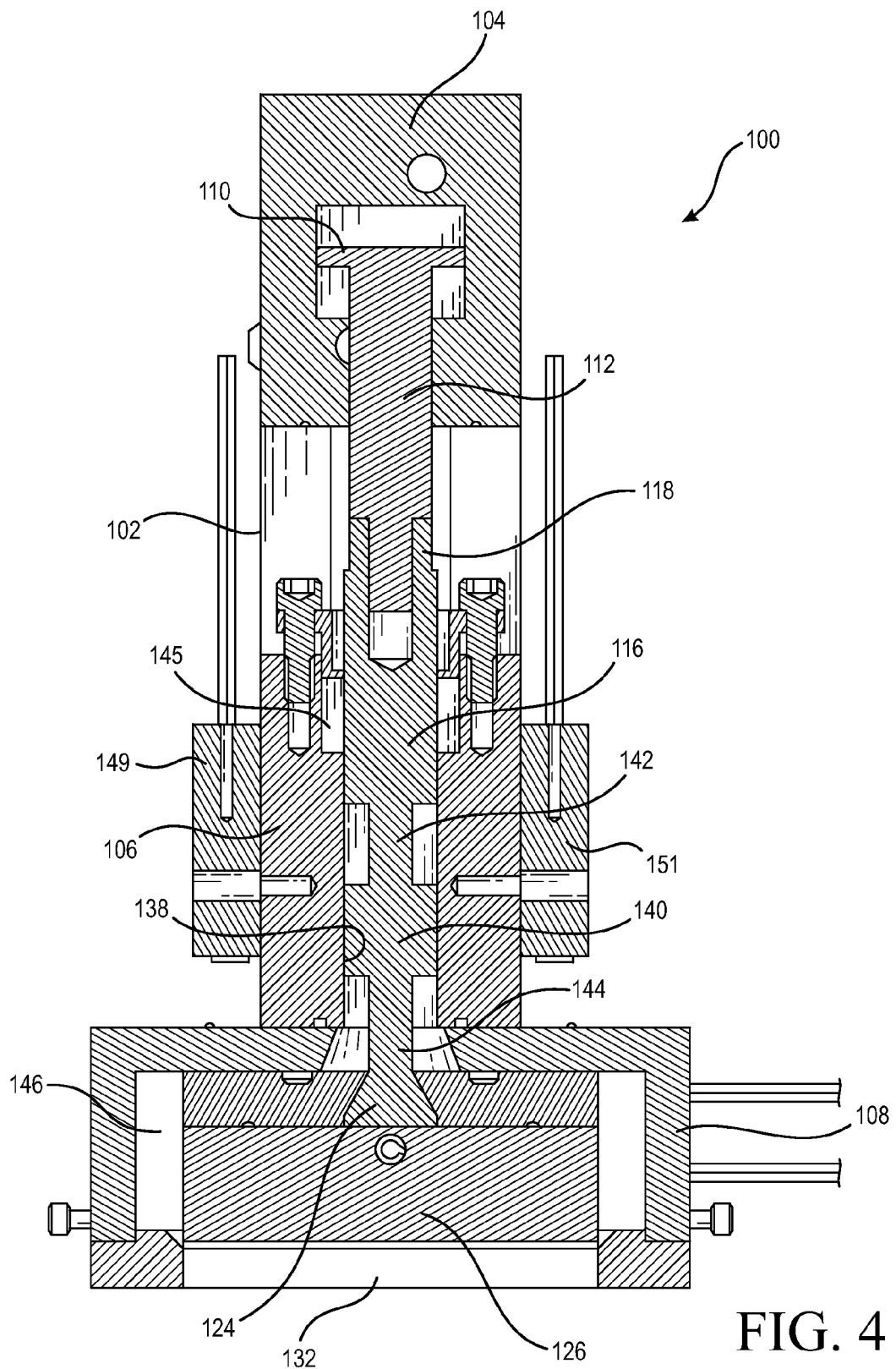
FIG. 4 is a cross-sectional view corresponding to FIG. 2 but taken through a cross-sectional plane oriented 90° from the cross-sectional view of FIG. 2.

It is lastly to be noted that when the plunger valve 118 is disposed at an intermediate TRANSITION position, as can best be appreciated from FIGS. 2 and 4, that is at a position where the valve member or shutoff blade 126 has only been partially elevated and retracted away from the adhesive material dispensing valve output or discharge port 132, the third intermediate enlarged diameter portion 140 of the valve plunger 118 will be disposed directly opposite the adhesive material inlet supply port 134. Accordingly, all incoming fluid flow of the adhesive material is, at this point in time, blocked—all fluid flow of the adhesive material coming in from the adhesive material inlet port 134 is zero, all fluid flow of the adhesive material out to the adhesive material outlet recirculation port 136 is zero, and all fluid flow of the adhesive material to the dispensing valve output or discharge port 132 is likewise zero. This structure is extremely important in connection with the operation of the dispensing valve 100 when the valve plunger 118 is moved both from the fully CLOSED position to the fully OPEN position, as well as from the fully OPEN position to the fully CLOSED position because, as can be appreciated from the drawings and this disclosure, the dispensing valve 100 of the present invention effectively has dual shutoff locations, a first shutoff location at the adhesive material inlet supply port 134, and a second shutoff location at the adhesive material output dispensing or discharge port 132.

More particularly, this structure is extremely important in connection with the operation of the dispensing valve 100 when the dispensing valve 100 is moved from the fully CLOSED position to the fully OPEN position because immediately before fluid flow is established from the adhesive material inlet supply port 134 to the adhesive material output dispensing or discharge port 132, the prevailing line pressure at the adhesive material output dispensing or discharge port 132 is minimal because the adhesive material inlet supply port 134, located upstream from the adhesive material output dispensing or discharge port 132, has been blocked or terminated by the disposition of the third intermediate enlarged diameter portion 140 of the valve plunger 116 being disposed directly opposite the adhesive material inlet port 134. This facilitates the achievement of "soft starts" or the dispensing of proper adhesive material outputs, as opposed to the deposition of excessive adhesive material outputs, because the relatively large line pressure does not immediately impact the adhesive material output dispensing or discharge port 132 as would otherwise be the case if the relatively large line pressure was permitted to build up immediately behind the valve member or shutoff blade 126 and to then be released when the valve member or shutoff blade 126 is retracted so as to be moved to the fully OPEN position. In connection with this structure, it is also noted that a suitable orifice or flow restrictor, not shown, can effectively be incorporated into the structure comprising the adhesive material outlet recirculation port whereby the pressure of the recirculated adhesive material can achieve a predetermined or defined pressure value which will, of course, also be the predetermined or defined pressure value of the adhesive material which is immediately available to or at the adhesive material output dispensing or discharge port when the dispensing valve 100 is disposed at its fully OPEN position.

Still further, this structure also minimizes the likelihood of the formation of any residual material or splatter being discharged from the adhesive material output dispensing or discharge port 132 when the valve plunger 116 is moved from the fully OPEN position to the fully CLOSED position. This is because, just as was the case when the valve member or shutoff blade 126 was partially retracted vertically upwardly from its fully CLOSED position before the third enlarged diameter portion 140 of the valve plunger 116 was likewise moved vertically upwardly a sufficient distance so as to begin to OPEN the adhesive material inlet supply port 134, in this opposite directional movement scenario, wherein the valve plunger 116 is being moved downwardly from its fully OPEN position to the fully CLOSED position, the third enlarged diameter portion 140 of the valve plunger 116 will fully block and close off the adhesive material inlet supply port 134 before the valve member or shutoff blade 126 is disposed at its fully CLOSED position. Accordingly, at this point in time, the line pressure prevailing at the shutoff blade 126 is minimal, and as the valve member or shutoff blade 126 enters the adhesive material output dispensing or discharge port 132 and terminates at a position flush with the undersurface portions of the adjacent shutoff outlet plates 128,130, it effectively pushes or forces any residual adhesive material out from adhesive material output dispensing or discharge port 132 such that no trailing ends or splatter of the adhesive material are able to be developed.

It is to be noted that the adhesive material to be utilized within the aforenoted system can either by a liquid adhesive or a heated bituminous adhesive material commonly known in the industry. As is well known, the bituminous adhesive is a solid at room temperature and must be heated to a temperature within the range of, for example, 375°-425° F. degrees for proper application. If a bituminous adhesive is being used, it is noted that the dispensing valve 100 is further provided with a first pair of oppositely disposed valve heater blocks 148,150 which are fixedly secured to opposite side walls of the lowermost section 108 of the valve housing 102 so as to effectively heat the adhesive material and the lowermost section 124 of the valve plunger 118, and maintain the same heated, while a second pair of oppositely disposed valve heater blocks 149,151 are fixedly secured to opposite side walls of the intermediate section 106 of the valve housing 102, as can best be seen in FIG. 4. In this manner, the second pair of valve heater blocks 149,151 also not only heat the adhesive material flowing into the system through the adhesive material inlet supply port 134, but they also heat the intermediate section of the valve plunger 118, and additionally serve to maintain the adhesive and the valve plunger 118 in a heated state so as to effectively prevent solidification of the adhesive material. Still further, while the aforenoted description has disclosed the operation of the dispensing valve 100 throughout its various OPEN, CLOSED, and TRANSITION stages, it is also to be noted that the dispensing valve may effectively be held at its OPEN position so as to permit purging and cleaning of, for example, the valve member or shut off blade 126 and the adhesive material output dispensing or discharge port 132 as a result of a suitable cleaning or solvent material being routed therethrough.

It is lastly noted that the diametrical size of the first and second reduced diameter portions 142,144 of the valve plunger 118, as well as the length of such portions, their relative axial locations along the valve plunger 118, and their relative dispositions with respect to the adhesive material inlet supply port 134, the adhesive material outlet recirculation port 136, and the shutoff blade 126 can affect the OPEN and CLOSING operations and output parameters of the dispensing valve 100. For example, the differences between the external diameters of the first and second reduced diameter portions 142,144 and the external diameters of the first, second, and third enlarged diameter portions 116,124,140 of the valve plunger 118 determines the effective size of the fluid flow path and therefore the volumetric output of the adhesive material being outputted or discharged from the adhesive material output dispensing or discharge port 132. The smaller the diametrical extents of the first and second reduced diameter portions 142,144, the larger the fluid flow paths for the adhesive material. The axial locations of the first and second reduced diameter portions 142,144 along the valve plunger 118, relative to each other as well as with respect to the adhesive material inlet supply port 134 and the adhesive material outlet recirculation port 136, controls the timing of the recirculation and adhesive material dispensing portions of each particular dispensing cycle as the valve plunger 118 cycles between the CLOSED, TRANSITION, OPEN, TRANSITION, and CLOSED positions as has been described hereinbefore in connection with a complete adhesive material dispensing cycle.

Obviously, many variations and modifications of the present invention are possible in light of the above teachings. It is therefore to be understood that within the scope of the appended claims, the present invention may be practiced otherwise than as specifically described herein.

LIST OF REFERENCE CHARACTERS

100—Dispensing valve
102—Valve housing
104—Uppermost section of valve housing
106—Intermediate section of valve housing
108—Lowermost section of valve housing
110—Piston head
112—Piston rod
114—Cylinder for piston head
116—First uppermost enlarged diameter portion of the valve plunger
118—Valve plunger
120—Upper input/output port/connector for pneumatic/hydraulic fluid driving piston
122—Lower input/output port/connector for pneumatic/hydraulic fluid driving piston
124—Second lowermost enlarged diameter portion of the valve plunger
126—Valve shutoff blade
128—Shutoff outlet plate
130—Shutoff outlet plate
132—Adhesive material dispensing or discharge output port
134—Adhesive material inlet supply port
136—Adhesive material outlet recirculation port
138—Cylinder portion of second intermediate housing section for valve plunger
140—Third intermediate enlarged diameter portion of valve plunger
142—First upper annularly configured reduced diameter portion of the valve plunger
144—Second lower annularly configured reduced diameter portion of valve plunger
145—Annular seal member around valve plunger
146—Annular conduits within lowermost housing section 148—First valve heater block
149—Second valve heater block
150—First valve heater block
151—Second valve heater block
P—System pump
T—System reservoir/supply tank

What is claimed as new and desired to be protected by Letters Patent of the United States of America, is:

1. A dispensing valve assembly for dispensing material, a valve housing;
a material inlet supply port;
a material outlet recirculation port fluidically connected to said material inlet supply port;
a material output dispensing/discharge port;
a valve plunger reciprocally movable within said valve housing between first and second end movement positions and through at least one intermediate TRANSITION position; and
a valve member mounted upon and operably movable with said valve plunger and operatively cooperable with said material output dispensing/discharge port so as to be seated within said material output dispensing/discharge port when said valve plunger is disposed at said first end movement position such that said dispensing valve is CLOSED, and to be unseated from said material output dispensing/discharge port when said valve plunger is disposed at said second end movement position whereby said dispensing valve is OPEN;
wherein dual material shutoffs are defined at said material inlet supply port and at said material output dispensing/discharge port, respectively, by said valve plunger and said valve member for terminating flow of the material from said material input supply port and said material output dispensing/discharge port when said valve plunger and said valve member are moved from said second end movement OPEN position, through said at least one intermediate TRANSITION position, and to said first end movement position corresponding to said CLOSED position of said dispensing valve such that minimal pressure is exerted upon said valve member and prevails at said material output dispensing/discharge port when said valve plunger and said valve member are to again be moved to said second end movement OPEN position whereby soft pressure dispensing starts are enabled.

2. The dispensing valve assembly as set forth in claim 1, further comprising:
a piston-cylinder assembly operatively connected to said valve plunger for moving said valve plunger and said valve member between said first and second end movement locations.

3. The dispensing valve assembly as set forth in claim 2, wherein:
said piston-cylinder assembly is operable by a fluid selected from the group comprising pneumatics and hydraulics.

4. The dispensing valve assembly as set forth in claim 1, wherein:
said valve plunger comprises multiple enlarged diameter portions and multiple reduced diameter portions which effectively define different flow paths for the material so as to alternatively permit the material to flow from said material inlet supply port to said material outlet recirculation port when said valve plunger is disposed at said first end movement position, and to flow from said material inlet supply port to said material output dispensing/discharge port when said valve plunger is disposed at said second end movement position.

5. The dispensing valve assembly as set forth in claim 4, wherein:
one of said multiple enlarged diameter portions of said valve plunger is disposed adjacent to said material inlet supply port so as to block fluid flow of the material from said material inlet supply port to said material dispensing/discharge port while one of said multiple reduced diameter portions of said valve plunger is simultaneously disposed adjacent to said material inlet supply port so as to permit fluid flow of the material from said material inlet supply port to said material outlet recirculation port when said dispensing valve is CLOSED.

6. The dispensing valve assembly as set forth in claim 5, wherein:
said one of said multiple enlarged diameter portions of said valve plunger is disposed adjacent to said material inlet supply port so as to block fluid flow of the material from said material inlet supply port to said material outlet recirculation port while a second one of said multiple reduced diameter portions of said valve plunger is simultaneously disposed adjacent to said material inlet supply port so as to permit fluid flow of the material from said material inlet supply port to said material output dispensing/discharge port when said dispensing valve is OPEN.

7. The dispensing valve assembly as set forth in claim 5, wherein:
said one of said multiple enlarged diameter portions of said valve plunger is disposed opposite to said material inlet supply port so as to block all fluid flow of the material from said material inlet supply port, all fluid flow of the material to said material outlet recirculation port, and all fluid flow to said material output dispensing/discharge port when said dispensing valve is disposed at a TRANSITION position.

8. The dispensing valve assembly as set forth in claim 1, wherein:
valve heater blocks are mounted upon said valve housing for heating the material and said valve plunger, and for maintaining the material and said valve plunger heated.

9. The dispensing valve assembly as set forth in claim 1, further comprising:
an actuator operatively connected to said valve plunger for moving said valve plunger between said first and second end movement positions; and
an annular seal disposed around said valve plunger so as to fluidically prevent any material from said material inlet supply port from flowing toward said actuator.

10. The dispensing valve assembly as set forth in claim 9, wherein:
said actuator is powered by a fluid selected from the group comprising pneumatics and hydraulics.

11. A dispensing valve assembly for dispensing material, comprising:
a valve housing;
a material inlet supply port;
a material outlet recirculation port fluidically connected to said material inlet supply port;
a material output dispensing/discharge port;
a valve plunger reciprocally movable within said valve housing between first and second end movement positions and through at least one intermediate TRANSITION position;

a valve member mounted upon and operably movable with said valve plunger and operatively cooperable with said material output dispensing/discharge port so as to be seated within said material output dispensing/discharge port when said valve plunger is disposed at said first end movement position such that said dispensing valve is CLOSED, and to be unseated from said material output dispensing/discharge port when said valve plunger is disposed at said second end movement position whereby said dispensing valve is OPEN; and wherein dual material shutoffs are defined at said material inlet supply port and at said material output dispensing/discharge port, respectively, by said valve plunger and said valve member for terminating flow of the material from said material input supply port and said material output dispensing/discharge port when said valve plunger and said valve shutoff blade are moved from said second end movement OPEN position, through said at least one intermediate TRANSITION position, and to said first end movement position corresponding to said CLOSED condition of said dispensing valve such that minimal pressure is exerted upon said valve member and prevails at said material output dispensing/discharge port when said valve plunger and said valve member are again to be moved to said OPEN position whereby excessive material output depositions/discharges from said material output dispensing/discharge port are avoided.

12. The dispensing valve assembly as set forth in claim 11, further comprising:
a piston-cylinder assembly operatively connected to said valve plunger for moving said valve plunger and said valve member between said first and second end movement locations.

13. The dispensing valve assembly as set forth in claim 12, wherein:
said piston-cylinder assembly is operable by a fluid selected from the group comprising pneumatics and hydraulics.

14. The dispensing valve assembly as set forth in claim 11, wherein:
said valve plunger comprises multiple enlarged diameter portions and multiple reduced diameter portions which effectively define different flow paths for the material so as to alternatively permit the material to flow from said material inlet supply port to said material outlet recirculation port when said valve plunger is disposed at said first end position, and to flow from said material inlet supply port to said material output dispensing/discharge port when said valve plunger is disposed at said second end position.

15. The dispensing valve assembly as set forth in claim 14, wherein:
one of said multiple enlarged diameter portions of said valve plunger is disposed adjacent to said material inlet supply port so as to block fluid flow of the material from said material inlet supply port to said material dispensing/discharge port while one of said multiple reduced diameter portions of said valve plunger is simultaneously disposed adjacent to said material inlet supply port so as to permit fluid flow of the material from said material inlet supply port to said material outlet recirculation port when said dispensing valve is CLOSED.

16. The dispensing valve assembly as set forth in claim 15, wherein:
said one of said multiple enlarged diameter portions of said valve plunger is disposed adjacent to said material inlet supply port so as to block fluid flow of the material from said material inlet supply port to said material outlet recirculation port while a second one of said multiple reduced diameter portions of said valve plunger is simultaneously disposed adjacent to said material inlet supply port so as to permit fluid flow of the material from said material inlet supply port to said material output dispensing/discharge port when said dispensing valve is OPEN.

17. The dispensing valve assembly as set forth in claim 15, wherein:
said one of said multiple enlarged diameter portions of said valve plunger is disposed opposite to said material inlet supply port so as to block all fluid flow of the material from said material inlet supply port, all fluid flow of the material to said material outlet recirculation port, and all fluid flow to said material output dispensing/discharge port when said dispensing valve is disposed at a TRANSITION position.

18. The dispensing valve assembly as set forth in claim 11, wherein:
valve heater blocks are mounted upon said valve housing for heating the material and said valve plunger, and for maintaining the material and said valve plunger heated.

19. The dispensing valve assembly as set forth in claim 11, further comprising:
an actuator operatively connected to said valve plunger for moving said valve plunger between said first and second end movement positions; and
an annular seal disposed around said valve plunger so as to fluidically prevent any material from said material inlet supply port from flowing toward said actuator.

20. The dispensing valve assembly as set forth in claim 19, wherein:
said actuator is powered by a fluid selected from the group comprising pneumatics and hydraulics.

21. A dispensing valve assembly for dispensing material, comprising:
a valve housing;
a material inlet supply port;
a material outlet recirculation port fluidically connected to said material inlet supply port;
a material output dispensing/discharge port;
a valve plunger reciprocally movable within said valve housing between first and second end movement positions and through at least one intermediate TRANSITION position;
a valve member mounted upon and operably movable with said valve plunger and operatively cooperable with said material output dispensing/discharge port so as to be seated within said material output dispensing/discharge port when said valve plunger is disposed at said first end movement position such that said dispensing valve is CLOSED, and to be unseated from said material output dispensing/discharge port when said valve plunger is disposed at said second end movement position whereby said dispensing valve is OPEN; and
wherein dual material shutoffs are defined at said material inlet supply port and at said material output dispensing/discharge port, respectively, by said valve plunger and said valve member for terminating flow of the material from said material input supply port and said material output dispensing/discharge port when said valve plunger and said valve shutoff blade are moved from said second end movement OPEN position, through said at least one intermediate TRANSITION position, and to said first end movement position corresponding to said CLOSED position of said dispensing valve such that minimal pressure is exerted upon said valve member and prevails at said material output dispensing/discharge port and said valve member when said valve member fully closes said material output dispensing/discharge port whereby residual trailing ends of the dispensed/discharged material are avoided.

22. The dispensing valve assembly as set forth in claim 21, further comprising:
a piston-cylinder assembly operatively connected to said valve plunger for moving said valve plunger and said valve member between said first and second end movement locations.

23. The dispensing valve assembly as set forth in claim 22, wherein:
said piston-cylinder assembly is operable by a fluid selected from the group comprising pneumatics and hydraulics.

24. The dispensing valve assembly as set forth in claim 21, wherein:
said valve plunger comprises multiple enlarged diameter portions and multiple reduced diameter portions which effectively define different flow paths for the material so as to alternatively permit the material to flow from said material inlet supply port to said material outlet recirculation port when said valve plunger is disposed at said first end movement position, and to flow from said material inlet supply port to said material output dispensing/discharge port when said valve plunger is disposed at said second end movement position.

25. The dispensing valve assembly as set forth in claim 24, wherein:
one of said multiple enlarged diameter portions of said valve plunger is disposed adjacent to said material inlet supply port so as to block fluid flow of the material from said material inlet supply port to said material dispensing/discharge port while one of said multiple reduced diameter portions of said valve plunger is simultaneously disposed adjacent to said material inlet supply port so as to permit fluid flow of the material from said material inlet supply port to said material outlet recirculation port when said dispensing valve is CLOSED.

26. The dispensing valve assembly as set forth in claim 25, wherein:
said one of said multiple enlarged diameter portions of said valve plunger is disposed adjacent to said material inlet supply port so as to block fluid flow of the material from said material inlet supply port to said material outlet recirculation port while a second one of said multiple reduced diameter portions of said valve plunger is simultaneously disposed adjacent to said material inlet supply port so as to permit fluid flow of the material from said material inlet supply port to said material output dispensing/discharge port when said dispensing valve is OPEN.

27. The dispensing valve assembly as set forth in claim 25, wherein:
said one of said multiple enlarged diameter portions of said valve plunger is disposed opposite to said material inlet supply port so as to block all fluid flow of the material from said material inlet supply port, all fluid flow of the material to said material outlet recirculation port, and all fluid flow to said material output dispensing/discharge port when said dispensing valve is disposed at a TRANSITION position.

28. The dispensing valve assembly as set forth in claim 21, wherein:
valve heater blocks are mounted upon said valve housing for heating the material and said valve plunger, and for maintaining the material and said valve plunger heated.

29. The dispensing valve assembly as set forth in claim 21, further comprising:
an actuator operatively connected to said valve plunger for moving said valve plunger between said first and second end movement positions; and
an annular seal disposed around said valve plunger so as to fluidically prevent any material from said material inlet supply port from flowing toward said actuator.

30. The dispensing valve assembly as set forth in claim 29, wherein:
said actuator is powered by a fluid selected from the group comprising pneumatics and hydraulics.

\* \* \* \* \*